(12) United States Patent
Pihlaja

(10) Patent No.: US 8,508,347 B2
(45) Date of Patent: Aug. 13, 2013

(54) APPARATUS AND METHOD FOR PROXIMITY BASED INPUT

(75) Inventor: Pekka Pihlaja, Hevonpää (FI)

(73) Assignee: Nokia Corporation, Espoo (FI)

( * ) Notice: Subject to any disclaimer, the term of this patent is extended or adjusted under 35 U.S.C. 154(b) by 510 days.

(21) Appl. No.: 12/822,496

(22) Filed: Jun. 24, 2010

(65) Prior Publication Data

US 2011/0316679 A1    Dec. 29, 2011

(51) Int. Cl.
*G08B 6/00*    (2006.01)

(52) U.S. Cl.
USPC ..................................................... 340/407.2

(58) Field of Classification Search
USPC ............. 340/407.2, 815.48, 815.78, 384.5; 345/157, 173; 715/700
See application file for complete search history.

(56) References Cited

U.S. PATENT DOCUMENTS

| | | | |
|---|---|---|---|
| 7,924,143 B2 * | 4/2011 | Griffin et al. | 340/407.2 |
| 8,255,836 B1 * | 8/2012 | Gildfind | 345/173 |
| 2002/0140633 A1 * | 10/2002 | Rafii et al. | 345/8 |
| 2003/0146905 A1 | 8/2003 | Pihlaja | |
| 2008/0297487 A1 * | 12/2008 | Hotelling et al. | 345/173 |
| 2010/0281410 A1 * | 11/2010 | Heintze | 715/769 |

FOREIGN PATENT DOCUMENTS

WO    WO 2008/132724 A1    11/2008

OTHER PUBLICATIONS

Hilliges, O. et al., *Interactions in the Air: Adding Further Depth to Interactive Tabletops*, UIST '09, Oct. 2009, Victoria, BC, Canada, pp. 139-148.

* cited by examiner

*Primary Examiner* — Phung Nguyen
(74) *Attorney, Agent, or Firm* — Alston & Bird LLP

(57) ABSTRACT

In accordance with an example embodiment of the present invention, a method is provided for controlling display operations in an electronic device. The electronic device provides an input mode, in which a first function is associated with a hovering input and a second function is associated with a touch input to an input surface. A three-dimensional virtual user interface item is displayed, and in response to detecting an input object within a guard range in relation to the input surface, the virtual user interface item is adapted to alert the user to avoid unintentionally touching the input surface.

15 Claims, 4 Drawing Sheets

APPARATUS AND METHOD FOR PROXIMITY BASED INPUT

FIELD

Embodiments of the present invention relate to an apparatus and a method for detecting proximity based input.

BACKGROUND

Touch screens are used in many portable electronic devices, for instance in PDA (Personal Digital Assistant) devices, tabletops, and mobile devices. Touch screens are operable by a pointing device (or stylus) and/or by a finger. Typically the devices also comprise conventional buttons for certain operations.

Lately, so-called hovering user interfaces have been proposed for devices with touch screens. Hovering refers generally to inputs by an object, such as a finger, in close proximity to a user interface input surface, but not touching the input surface. Thus, also the space above a touch screen surface may be used as further means for user inputs. For instance, the user interface can be arranged to react to finger hovering by popping up a menu. The desired item on the menu may then be selected touching the screen. People who are using mobile devices generally wish to have more versatile and intuitive ways to interact with their devices.

SUMMARY

Various aspects of examples of the invention are set out in the claims.

According to an aspect, an apparatus is provided, comprising at least one processor; and at least one memory including computer program code, the at least one memory and the computer program code configured to, with the at least one processor, cause the apparatus at least to perform: in response to detecting presence of an input object in close proximity to an input surface, activate an input mode, in which a first function is associated with a hovering input and a second function is associated with a touch input, display a three-dimensional virtual user interface item, and in response to detecting the input object within a guard range in relation to the input surface, adapt the three-dimensional virtual user interface item to alert the user to avoid unintentionally touching the input surface.

According to an aspect, a method is provided, comprising: providing an input mode, in which a first function is associated with a hovering input and a second function is associated with a touch input to an input surface, displaying a three-dimensional virtual user interface item, and in response to detecting an input object within a guard range in relation to the input surface, adapting the three-dimensional virtual user interface item to alert the user to avoid unintentionally touching the input surface.

According to an example embodiment, the input object is detected to virtually touch the three-dimensional virtual user interface item, and the appearance of the three-dimensional virtual user interface item is adapted in response to the detection of the virtual touch.

According to another example embodiment, the apparatus is configured to determine distance of the input object to the input surface, and the apparatus is configured to select between at least two available appearances of the three-dimensional virtual user interface item on the basis of the distance of the input object to the input surface.

According to a still another example embodiment, a first input mode is entered in response to detecting the hovering input or the presence of the input object in close proximity to input surface and a second input mode is entered in response to detecting the touch input, and the appearance of the three-dimensional virtual user interface item is adapted to notify the user of a change of an input mode between the first input mode and the second input mode in response to detecting the input object within the predetermined guard range.

The invention and various embodiments of the invention provide several advantages, which will become apparent from the detailed description below.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

Figure 1:
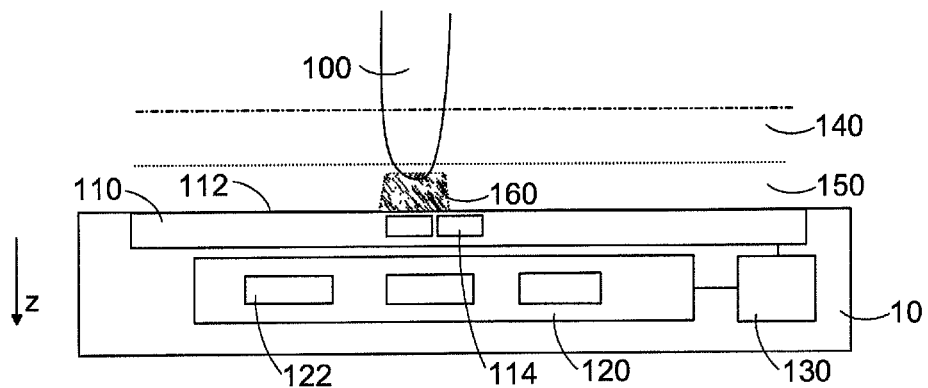
FIG. 1 is a simplified block diagram of a side view of an input apparatus in accordance with an example embodiment of the invention.

FIG. 1 illustrates an example apparatus 10 with one or more input and/or output devices. The input devices may for example be selected from buttons, switches, sliders, keys or keypads, navigation pads, touch pads, touch screens, and the like. The output devices may be selected from displays, speakers, indicators, for example.

The apparatus 10 further comprises a proximity detection system or unit 120 configured to detect when an input object 100, such as a finger or a stylus, is brought in close proximity to, but not in contact with, an input surface 112. The input surface 112 may be a surface of a touch screen or other input device of the apparatus capable of detecting user inputs.

A sensing area 140 may illustrate the approximate area and/or distance at which an input object 100 is detected to be in close proximity to the surface 112. The sensing area 140 may also be referred to as a hovering area and introduction of an input object 100 to the hovering area and possible further (non-touch) inputs by the object 100 in the hovering area may be referred to as hovering. In some embodiments the hovering area 140 enables also inputting and/or accessing data in the apparatus 10, even without touching the input surface 112. A user input, such as a particular detected gesture, in the hovering area 140 detected at least partly based on the input object 100 not touching the input surface 112 may be referred to as a hovering input. Such hovering input is associated with at least one function, for instance selection of an user interface (UI) item, zooming a display area, or activation of a pop-up menu.

The apparatus 10 may be a peripheral device, such as a keyboard or mouse, or integrated in an electronic device. Examples of electronic devices include any consumer electronics device like computers, media players, wireless communications terminal devices, and so forth.

In some embodiments, a proximity detection system 120 is provided in an apparatus comprising a touch screen display. Thus, the apparatus of FIG. 1 may comprise a touch screen 110. A plurality of touch sensitive detectors 114 may be provided to detect touch inputs to the touch screen input surface.

In some embodiments the detection system 120 generates a sensing field by one or more proximity sensors 122. In one example embodiment a capacitive proximity detection system is applied, whereby the sensors 122 are capacitive sensing nodes. Disturbances by one or more input objects 100 in the sensing field are monitored and presence of one or more objects is detected based on detected disturbances. A capacitive detection circuit 120 detects changes in capacitance above the surface of the touch screen 110.

However, it will be appreciated that the present features are not limited to application of any particular type of proximity detection. The proximity detection system 120 may be based on infrared proximity detection, optical shadow detection, acoustic emission detection, ultrasonic detection, or any other suitable proximity detection technique. For instance, in case the proximity detection system 120 would be based on infrared detection, the system would comprise one or more emitters sending out pulses of infrared light. One or more detectors would be provided for detecting reflections of that light from nearby objects 100. If the system detects reflected light, then an input object is assumed to be present. The detection system 120 may be arranged to estimate the distance of the input object 100 from the input surface 112, which enables to provide z coordinate data of the location of the object 100 in relation to the input surface. The proximity detection system 120 may also be arranged to generate information on x, y position of the object 100 in order to be able to determine a target UI item or area of a hovering input. X and y directions are generally substantially parallel to the input surface 112, and the z direction is substantially normal to input surface 112.

Depending on the proximity detection technique applied, the size of the apparatus 10 and the input surface 112, and the desired user interaction, the hovering area 140 may be arranged to extend from the input surface 112 by distance selected from some millimetres to even up to multiple dozens of centimeters, for instance. The proximity detection system 120 may be arranged to detect also further parts of user's hand, and the system may be arranged to recognize false inputs and avoid further actions.

The proximity detection system 120 is coupled to a controller 130. The proximity detection system 120 is configured to provide the controller 130 with signals when an input object 100 is detected in the hovering area 140. Based on such input signals, commands, selections and other types of actions may be initiated, typically causing visible, audible and/or tactile feedback for the user. Touch inputs to the touch sensitive detectors 114 may be signalled via a control circuitry to the controller 130, or another controller.

The controller 130 may also be connected to one or more output devices, such as the touch screen display 110. The controller 130 may be configured to control different application views on the display 110. The controller 130 may detect touch inputs and hovering inputs on the basis of the signals from the proximity detection system 120 and the touch sensitive detectors 114. The controller 130 may then control a display function associated with a detected touch input or hovering input. It will be appreciated that the controller 130 functions may be implemented by a single control unit or a plurality of control units.

Generally, with hovering user interfaces it may be difficult to control the input object 100 so that it gets near enough to the input surface without touching it. It may be difficult to control movement which is supposed to stop in mid-air, for instance 1 centimeter above a graphical user interface (GUI) item, and to avoid touching the display inadvertently.

Without limiting the scope of the claims, in some example embodiments this problem may be at least alleviated by generating an illusion of a UI item protruding of the input surface, as will be further illustrated by examples below, referring also to FIG. 1.

The apparatus 10 may be arranged to generate a three-dimensional virtual UI item 160, which generally refers to three-dimensional presentation of an UI item. The three-dimensional virtual UI item, hereafter generally referred also to as "virtual UI item", is an UI item representation at least part of which is stereoscopic or providing sensation of three-dimensional object. The virtual UI item 160 can serve as a visual target for finger movements. Also, if the virtual UI item 160 is larger than a fingertip of a user, the user may be able to keep the finger at suitable distance from the display surface by matching its depth with that of the item. In some examples this may enable to provide an intuitive and reliable hovering interaction.

In some embodiments, a guard range 150 within the hovering area 140 is monitored. In response to detecting the input object 100 within the guard range 150 in relation to the input surface, the three-dimensional virtual UI item 160 is adapted to alert the user to avoid unintentionally touching the input surface. For instance, the virtual UI item may be blinked or changed into another form or colour in response to detecting the input object to enter the guard range 150. This further enables to better prevent erroneous touch inputs. The term "guard range" is to be broadly understood to refer to an area at which presence of an input object can be detected, and the area does not need to be precisely determined by the apparatus 10.

In one embodiment the apparatus 10 may be arranged to determine if an input object is within the guard range by estimating the distance between the input object 100 and the input surface 112 and comparing the estimated distance to a predetermined guard or alert distance value. Depending on the technique applied, the size of the apparatus and the input surface, and the desired user interaction, the guard range 150 may be arranged to extend from the input surface by a distance selected from one millimeter to five centimeters, for instance.

However, it will be appreciated that the alerting of the user may be controlled directly or indirectly based on other evaluations. For instance, in another embodiment the apparatus 10 may be arranged to determine presence of an input object 100 within the guard range on the basis of comparison between intensity of a proximity detection signal from the proximity detection system 120 and a threshold value. Thus, the guard range 150 may be implicitly defined by the selected threshold value, and the input object 100 may be detected as being within the guard range directly in response to detecting the threshold value being exceeded.

The electronic device 10 may thus further comprise a stereoscopic display capable of displaying stereoscopic presentations of UI items, e.g., UI items perceived by the user as three-dimensional (3D) images. To this end, the stereoscopic display may direct information from certain sub-pixels of an image in different directions, so that a viewer can see a different picture with each eye. If the pictures are similar enough, the human brain will assume that the viewer is looking at a single object and fuse matching points on the two pictures together to create a perceived single object. The data for a 3D image may be obtained for instance by taking multiple two-dimensional images and by combining the pixels of the images to sub-pixels of a single image for the presentation on the stereoscopic display. In one alternative, two cameras that are arranged at a small pre-specified distance relative to each other take the two-dimensional images for a 3D presentation. Each camera may comprise an image chain applying an image processing to the captured images. The stereoscopic display system may also comprise a user imaging device and eye location tracking functionality.

Depending on desired implementation and applied stereoscopic display technology, the touch-screen display 110 may be arranged to provide stereoscopic display features, or elements of the stereoscopic display may be at least partly separate from the touch-screen display 110 (not specifically shown in FIG. 1). In one embodiment the stereoscopic display is an autostereoscopic display and the virtual UI item is an autostereoscopic UI item, which refers generally to a stereoscopic presentation of an UI item not requiring specific glasses for the user. Various autostereoscopic displays may be applied, for example autostereoscopic displays based on parallax barriers and/or lenticular lenses or applying holography and/or eye-tracking.

It will be appreciated that the apparatus 10 may comprise various further elements not discussed in detail herein. Although the apparatus 10 and the controller 130 are depicted as a single entity, different features may be implemented in one or more physical or logical entities. There may be further specific functional module(s), for instance for carrying one or more of the blocks described in connection with FIG. 2 or 3.

Figure 2:
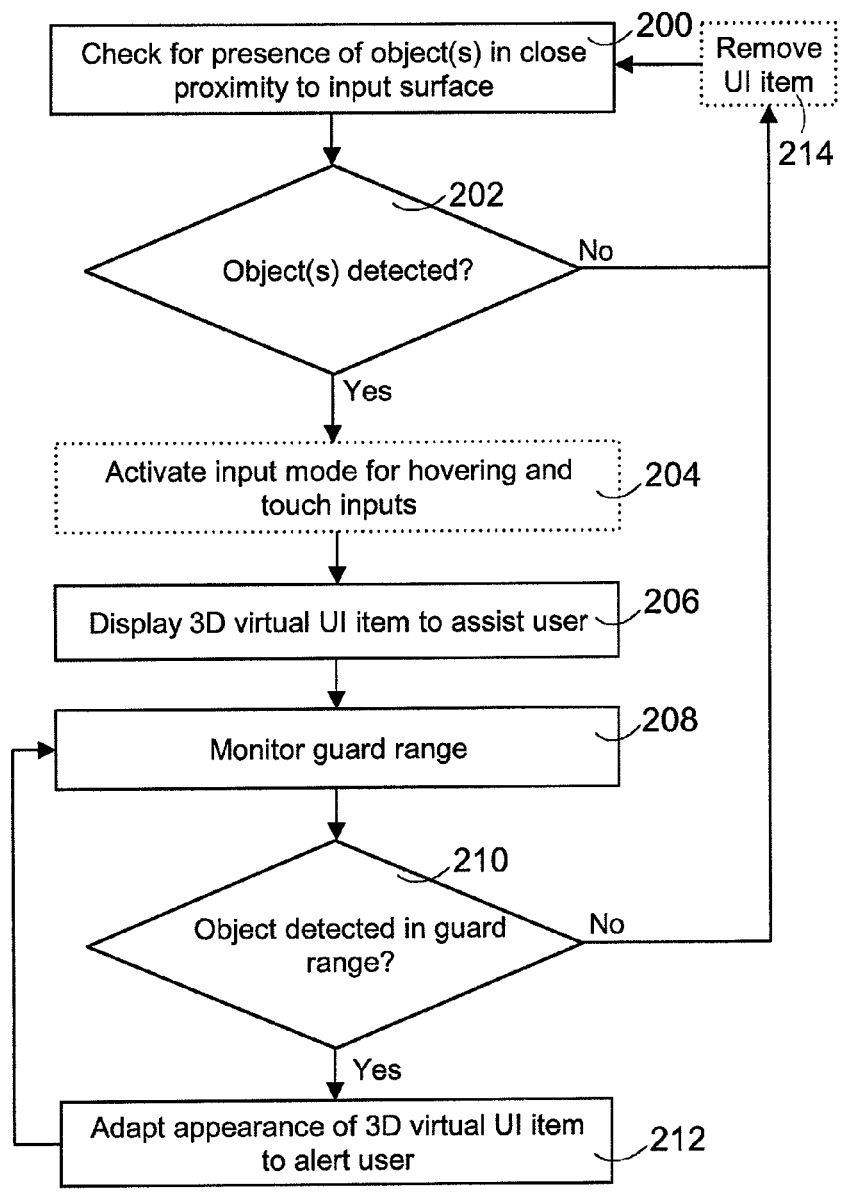
FIG. 2 illustrates a method according to an example embodiment of the invention.

FIG. 2 shows a method for controlling an input mode enabling hovering and tactile inputs and displaying of 3D virtual UI items according to an example embodiment. The method may be applied as a control algorithm by the controller 130, for instance.

The method starts in block 200, whereby presence of at least one input object in close proximity to an input surface is checked. This check may be carried out continuously, for instance when touch inputs are enabled (keypad lock is not on). The procedure may check 200, 202, in accordance with the applied proximity detection system, if at least one object is within the hovering area or range 140. This may be carried out by comparing a proximity detection signal from the proximity detection system 120 to a threshold value, for instance.

If at least one object is detected in close proximity to the input surface, an input mode enabling hovering and touch inputs may be activated 204 (if not already active). The input mode may associate a first function with a hovering input and a second function with a touch input. The two different functions may be associated with the same x, y position, e.g., a first function initiated by touching on an associated x, y position may be different from a second function initiated by hovering, but not touching, on top of the exactly or at least partially the same x, y position.

Block 204 may be entered when an object 100 is detected to enter the hovering area 140, even though physical contact is not made with the input surface. Thus, the controller 130 may detect that the distance of the object 100 to the input surface is below a hovering trigger distance, for instance. However, it is to be appreciated that the input mode may be applied in general, for instance by default, and need not to be specifically activated. Furthermore, it will be appreciated that there may be various further input modes, and the applied input mode(s) may be changed based on current usage context, user input, application, etc.

A virtual 3D UI item is displayed 206 to assist the user. The 3D UI item may be specifically generated to assist the user to cause hovering input(s), for instance a gesture activating a particular function for an information item associated with the 3D virtual UI item. In one example, the 3D UI item may be a 3D button which may be virtually pushed by a hovering input. A guard range, such as the range 150 illustrated in FIG. 1, is monitored 208, 210. This may be carried out by comparing a proximity detection signal from the proximity detection system 120 to a threshold value associated with the guard range, for instance. In one embodiment the guard range monitoring 208, 210 is based on monitoring the distance of the object to the input surface 112.

In response to detecting 208, 210 at least one object in the guard range, at least one associated 3D virtual UI item, such as the UI item displayed in block 206, is adapted 212 to alert the user to avoid unintentional touching of the input surface.

The method illustrated in FIG. 2 continuously monitors 208 the guard range and thus returns to block 208 after adapting 212 the UI item. If no object was detected in the guard range, the process may return to check 200 if an object is (still) detected in the hovering range 140.

The example of FIG. 2 also indicates by block 214 that, in case the user is alerted in block 212 and thereafter removal of the object is detected in block 210, the virtual UI item alerting the user may be deleted. Further, in one embodiment the displayed 206 virtual UI item is removed in response to detecting 202 subsequent removal of the object from the hovering area 140. Additionally, not shown in FIG. 2, the apparatus 10 may continuously check for user inputs, for instance based on monitoring user gestures and inputs detected by the touch-sensitive detectors 114.

It will be appreciated that various modifications and additions may be made in the procedure illustrated in the simplified FIG. 2. For instance, in one example variation of FIG. 2, the virtual 3D UI may be displayed, instead of or after detecting the hovering input object, on the basis of some other trigger, such as a push of a button. Thus, the 3D virtual UI item, the appearance of which is adapted (312) to alert the user, may be displayed regardless if an object is detected in the hovering area 140. Hence, it is also possible to apply only part of the features of FIG. 2. For example, the controller 130 may be arranged to carry out an algorithm for controlling functions of blocks 206 to 212.

Figure 3:
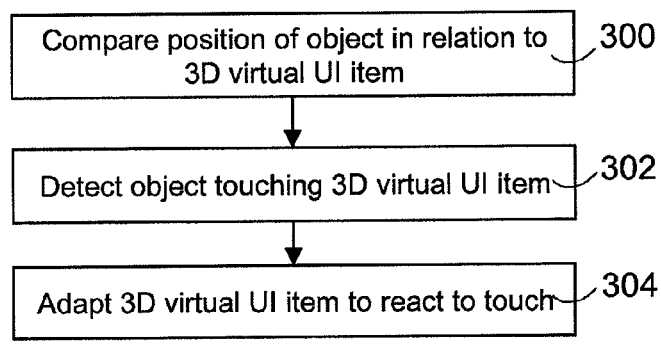
FIG. 3 illustrates a method according to an example embodiment of the invention.

In one embodiment, with reference to the example of FIG. 3, the apparatus 10 is configured to compare 300 the position of the input object in relation to the (outer edge of) the virtual UI item 160. The procedure may be entered in response to initiating display 206 of the virtual UI item, for instance. The controller 130 may be arranged to receive x, y, z position information on the object 100 in relation to the input surface 112 and detect when the object is positioned in the hovering area substantially at the position defined for the outer edge of the virtual UI item 160. In case there is a match, the input object is detected 302 to virtually touch the virtual UI item. The apparatus may be configured to adapt 304 the appearance of the virtual UI item to react to the detected virtual touch. For instance, the virtual UI item may be adapted to imitate a receding button.

In one embodiment the guard range 150 and the virtual UI item 160 similarly extend in the z direction out of the input surface 112. In response to detecting the object 100 entering the guard range 150, a virtual touch is detected and the appearance of the virtual UI item may be adapted.

The apparatus 10 may be configured to select between at least two available appearances of the virtual UI item 160. Each of the appearances may be associated with a specific range of distance to the input surface.

However, it will be appreciated that a very large number of options exist for adapting (212) the 3D virtual UI item, which is to be understood broadly to refer to any type of change in the visual appearance of the displayed 3D virtual UI item, including also controlling display of another virtual UI item.

Figures 4A, 4B:
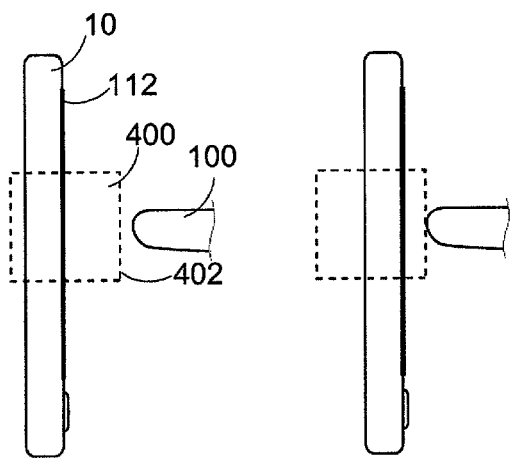
FIGS. 4a to 4h illustrate user interface interaction sequence examples.

FIGS. 4a to 4h illustrate some examples of 3D virtual UI items and their adaptation in response to an approaching input object 100. As illustrated in FIG. 4a, a virtual UI item 400 is displayed. In response to detecting the object 100 to be positioned at an outer edge 402 of the virtual UI item 400, which may also substantially correspond to the outer edge of the guard range, a virtual touch is detected.

When the user brings the finger closer to the input surface 112, the virtual UI item may be adapted to alert the user. In the example of FIG. 4b, the position or outer edge 402 of the virtual UI item is moved, thus creating the illusion of the user pushing the virtual UI item.

Figure 4C:
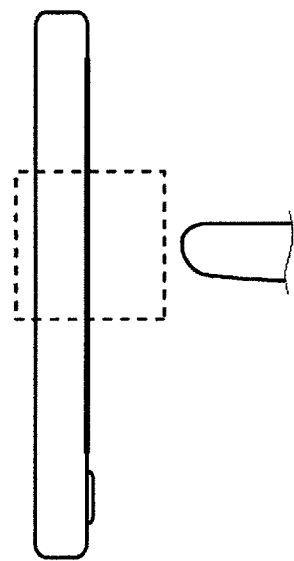
Figure 4D:
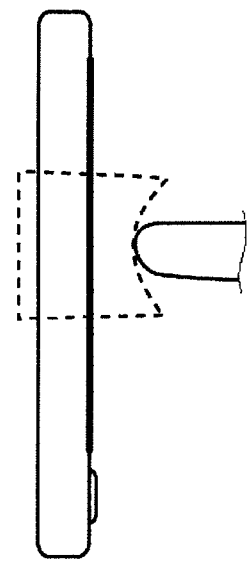

FIGS. 4c to 4h illustrate some other examples on how the appearance of the virtual UI item 400 may be adapted in response to detecting virtual touch. As illustrated in FIGS. 4c and 4d, the format of the virtual UI item may be changed in response to detecting the virtual touch and further movement of the input object 100 towards the input surface 112.

Figure 4E:
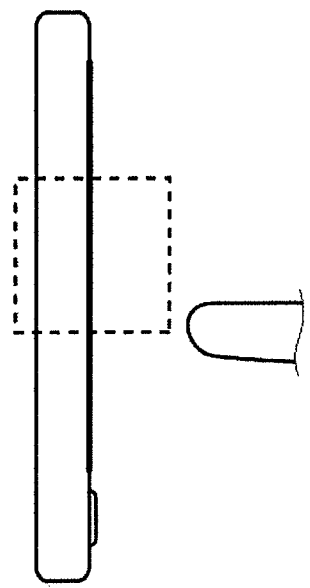
Figure 4F:
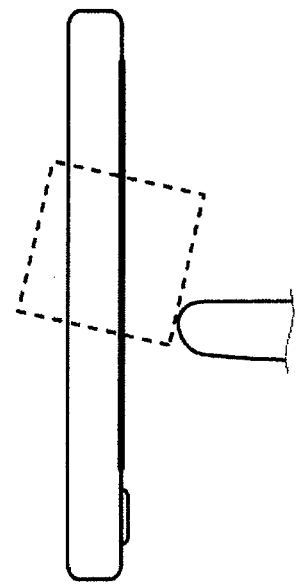
Figures 4G, 4H:
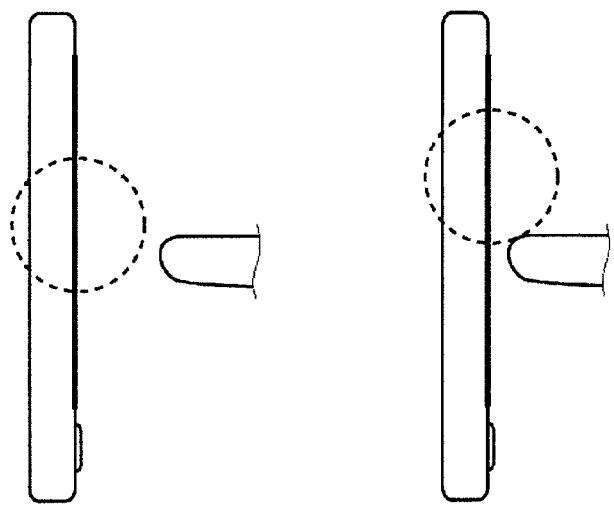

In one embodiment the appearance of the virtual UI item 160, 400 may be adapted in accordance with the detected position of (a reference point of) the input object 100 in relation to the visual UI item. For example, as illustrated in FIGS. 4e and 4f, the virtual UI item may be adapted to indicate changed orientation in response to detecting the input object virtually touching and further approaching the input surface on a corner area of the virtual UI item.

However, it will be appreciated that various visual changes and combinations of visual effects may be applied for adapting (212) the visual appearance of the virtual UI item 160 in response to detecting the object in the guard range 150 and/or detecting the virtual touch. For instance, the form, size, position, and/or perspective of the virtual UI item 400 may be adapted in various ways. Instead or in addition of such example visual changes, the virtual UI item may be adapted by changing the transparency, colours or other parameters of the virtual UI item, and/or blinking the virtual UI item. For example, the virtual UI item 160 may be first displayed 206 as opaque, and then the virtual UI item may be displayed 212 as at least partially transparent in response to detecting the input object within the predetermined guard range. A still further example is that the virtual UI item is adapted by displaying an animation.

In one embodiment the apparatus 10 is configured to detect gestures by one or more objects (separately or in combination) in the hovering area 140. For instance, a gesture sensing functionality is activated in response to detecting 200 the hovering input object or activating 204 the input mode. Changes in the proximity sensing field may thus be monitored. A gesture is identified based on the detected changes. An action associated with the identified gestures may then be performed. For example, in response to detecting a gesture similar to movement of a finger when double-clicking a mouse button, a GUI element is selected and a further action is performed for the selected GUI element, e.g. a new application window with contents of a selected uniform resource locator (URL) is displayed. Another example is that the apparatus 10 may be configured to detect movement of an object to form a circle and thus move to a subsequent or preceding view. The present alerting related features may be particularly useful for assisting the user performing gestures to avoid unintentional touches.

A broad range of functions is available for selection to be associated with an input detected by a touch sensitive detection system and/or the proximity detection system 120. The controller 130 may be configured to adapt the associations according to a current operating state of the apparatus 10, a user input or an application executed in the apparatus 10, for instance. For instance, associations may be application specific, menu specific, view specific and/or context (which may be defined on the basis of information obtained from the current environment or usage of the apparatus 10) specific. In one embodiment the proximity detection system 120 may be arranged to detect combined use of two or more objects. According to some embodiments, two or more objects 100 may be simultaneously used in the hovering area 140 and specific functions may be triggered in response to detecting further objects.

In one example embodiment a specific display and/or input mode may be entered after detecting (212) one or more input objects in the guard range. The UI of the apparatus 10 may be arranged to enter a first input mode in response to detecting a hovering input or the presence 204 of the object in close proximity to input surface and a second input mode in response to detecting a touch input. The apparatus 10 may be arranged to display the virtual UI item or adapt the appearance 212 of the virtual UI item, for notifying or alerting the user of (an upcoming) change of an input mode between the first input mode and the second input mode in response to detecting the input object within the predetermined guard range.

For example, the first mode may be a hovering input mode and the second mode may be a touch input mode. When the input object is detected to approach the input surface, the user may be notified that the input mode is about to change from a hovering input mode to a touch input mode by a symbol, text, an audible output and/or a haptic notification, for instance.

Software functions or actions available during at least some of blocks 204 to 212 may be indicated to the user, for instance on the touch-sensitive display 110. A function may be indicated when the function is available in an associated area of the display 110 and/or when a hovering input has been detected. The 3D virtual UI item may indicate a software function available by a hovering action.

In one example embodiment the above indicated user alerting features are applied only to some of 3D virtual UI items displayed by the apparatus 10. The above-illustrated features may be applied for different applications and applications modes.

In one embodiment the apparatus 10 is configured to control user interface actions on the basis of further properties associated with movement of the object 100 in the hovering area 140 and/or alert range 150. For instance, the apparatus 10 may be configured to control actions on the basis of speed of the movement of the object 100. Various actions associated with the virtual UI item 160 may be associated with the movement of the object 100 in the z direction and/or x, y direction.

Figure 5:
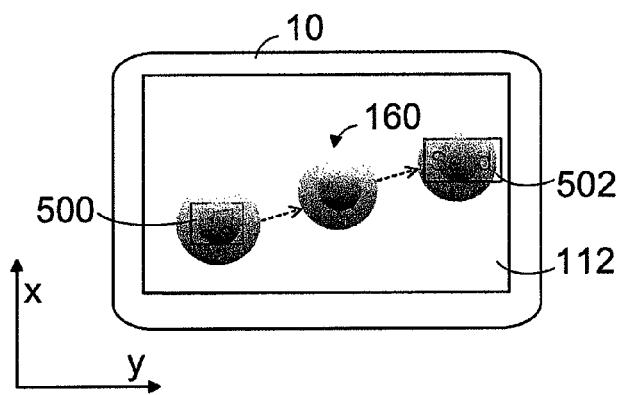
FIG. 5 illustrates a top-view example of display operations.

FIG. 5 is example of display operations, in which a virtual UI item 160 is first displayed above a first GUI item 500, for instance a music file. As illustrated, the virtual UI item 160 may be at least partly transparent. The apparatus 10 may be arranged to monitor x, y position of an input object 100 associated with the virtual UI item 160 after selection of the virtual UI item. In response to detecting movement of the input object (hovering above or touching the input surface 112), the display position of the virtual UI item 160 is also changed in relation to the movement of the input object. A further action associated with the new position of the input object may then be initiated. For instance, the user may first perform a selection action for a music file 500 and move the input object over a "Send" UI item 502 associated with sending operation. In one embodiment the virtual UI item 160 or a portion thereof serves as a pointer element and may further indicate this capability by an arrow, for instance.

The position of the virtual UI item 160 may be varied, and the x, y position of the UI item 160 may differ by an offset from the position (of a reference point) of the input object 100. In one example embodiment the apparatus 10 is configured to cause display of a further pointer element, for instance in block 204 or 206. The pointer element may indicate a current point on which the input object is currently focused (which thus may differ from the actual x, y position of the input object). For instance, virtual stylus related features in U.S. patent application publication No. US2003/0146905, incorporated herein by reference, may be applied in connection with the present multi-object hovering input mode.

Figure 6:
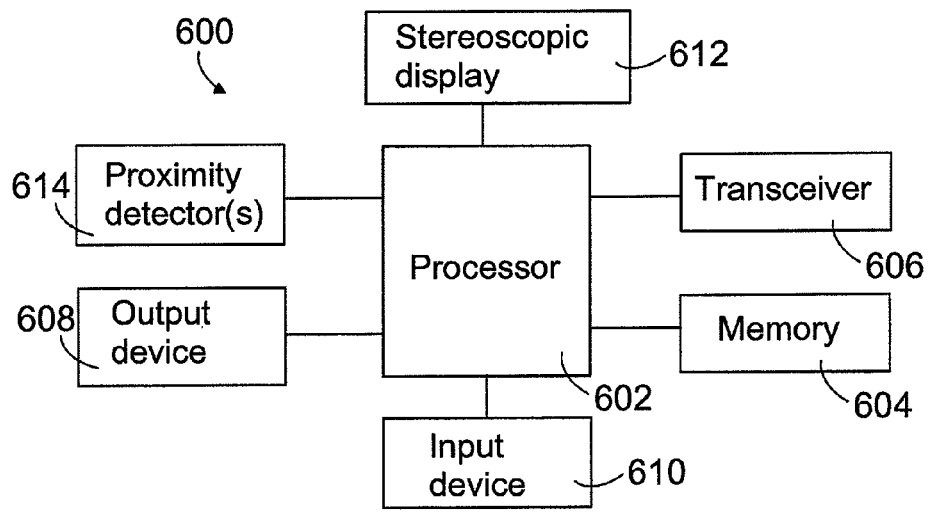
FIG. 6 illustrates an electronic device in accordance with an example embodiment of the invention.

FIG. 6 shows a block diagram of the structure of an electronic device 600 according to an example embodiment. The electronic device may comprise the apparatus 10. Although one embodiment of the electronic device 600 is illustrated and will be hereinafter described for purposes of example, other types of electronic devices, such as, but not limited to, portable digital assistants (PDAs), pagers, mobile computers, desktop computers, laptop computers, tablet computers, media players, televisions, gaming devices, cameras, video recorders, positioning devices, electronic books, wearable devices, projector devices, and other types of electronic systems, may employ the present embodiments.

Furthermore, the apparatus of an example embodiment need not be the entire electronic device, but may be a component or group of components of the electronic device in other example embodiments. For example, the apparatus could be in a form of a chipset or some other kind of hardware module for controlling by performing at least some of the functions illustrated above, such as the functions of the controller 130 of FIG. 1. A processor 602 is configured to execute instructions and to carry out operations associated with the electronic device 600. The processor 602 may comprise means, such as a digital signal processor device, a microprocessor device, and circuitry, for performing various functions including, for example, one or more of the functions described in conjunction with FIGS. 1 to 5. The processor 602 may control the reception and processing of input and output data between components of the electronic device 600 by using instructions retrieved from memory. The processor 602 can be implemented on a single-chip, multiple chips or multiple electrical components. Some examples of architectures which can be used for the processor 602 include dedicated or embedded processor, and an application specific integrated circuit (ASIC).

The processor 602 may comprise functionality to operate one or more computer programs. Computer program code may be stored in a memory 604. The at least one memory and the computer program code may be configured to, with the at least one processor, cause the apparatus to perform at least one embodiment including, for example, control of one or more of the functions described in conjunction with FIGS. 1 to 5. For example, the processor 602 may be arranged to perform at least part of the functions of the controller 130 of FIG. 1. Typically the processor 602 operates together with an operating system to execute computer code and produce and use data.

By way of example, the memory 604 may include non-volatile portion, such as electrically erasable programmable read only memory (EEPROM), flash memory or the like, and a volatile portion, such as a random access memory (RAM) including a cache area for temporary storage of data. The information could also reside on a removable storage medium and loaded or installed onto the electronic device 600 when needed.

The electronic device 600 may comprise an antenna (or multiple antennae) in operable communication with a transceiver unit 606 comprising a transmitter and a receiver. The electronic device 600 may operate with one or more air interface standards and communication protocols. By way of illustration, the electronic device 600 may operate in accordance with any of a number of first, second, third and/or fourth-generation communication protocols or the like. For example, the electronic device 600 may operate in accordance with wireline protocols, such as Ethernet and digital subscriber line (DSL), with second-generation (2G) wireless communication protocols, such as Global System for Mobile communications (GSM), with third-generation (3G) wireless communication protocols, such as 3G protocols by the Third Generation Partnership Project (3GPP), Code Division Multiple Access (CDMA) 2000, wideband CDMA (WCDMA) and time division-synchronous CDMA (TD-SCDMA), with fourth-generation (4G) wireless communication protocols, such as 3GPP Long Term Evolution (LTE), wireless local area networking protocols, such as 802.11, short-range wireless protocols, such as Bluetooth, and/or the like.

The user interface of the electronic device 600 may comprise an output device 608, such as a speaker, one or more input devices 610, such as a microphone, a keypad or one or more buttons or actuators, and a stereoscopic display device 612 capable of producing 3D images, such as of any autostereoscopic display type appropriate for the electronic device 600 in question.

The input device 610 may include a touch sensing device configured to receive input from a user's touch and to send this information to the processor 602. Such touch-sensing device may be configured to recognize also the position and magnitude of touches on a touch sensitive surface. The touch sensing device may be based on sensing technologies including, but not limited to, capacitive sensing, resistive sensing, surface acoustic wave sensing, pressure sensing, inductive sensing, and optical sensing. Furthermore, the touch sensing device may be based on single point sensing or multipoint sensing. In one embodiment the input device is a touch screen, which is positioned in front of the display 612.

The electronic device 600 also comprises a proximity detection system 614, such as the system 120, 220 illustrated earlier, operatively coupled to the processor 602. The proximity detection system 614 is configured to detect when a finger, stylus or other pointing device is in close proximity to, but not in contact with, some component of the computer system including for example housing or I/O devices, such as the touch screen.

The electronic device 600 may comprise also further units and elements not illustrated in FIG. 6, such as further interface devices, a battery, a media capturing element, such as a camera, video and/or audio module, and a user identity module.

In some embodiments further outputs, such as an audible and/or tactile output may also be produced by the apparatus 10 after detecting the input object in the guard range. Thus, the processor 602 may be arranged to control a speaker and/or a tactile output actuator, such as a vibration motor, in the electronic device 600 to provide such further alerting output.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 6. A computer-readable medium may comprise a computer-readable storage medium that may be any media or means that can contain or store the instructions for use by or in connection with an instruction execution system, apparatus, or device, such as a computer.

If desired, at least some of the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
at least one processor; and
at least one memory including computer program code,
the at least one memory and the computer program code configured to, with the at least one processor, cause the apparatus at least to:
provide an input mode, in which a first function is associated with a hovering input and a second function is associated with a touch input to an input surface,
cause displaying of a three-dimensional virtual user interface item, and
in response to detecting an input object within a guard range in relation to the input surface, adapt the three-dimensional virtual user interface item to alert a user to avoid unintentionally touching the input surface, wherein
the apparatus is configured to determine distance of the input object to the input surface, and
select between at least two available appearances of the three-dimensional virtual user interface item on the basis of the distance of the input object to the input surface.

2. The apparatus of claim 1, wherein the apparatus is configured to detect the input object to virtually touch the three-dimensional virtual user interface item, and
the apparatus is configured to adapt the appearance of the three-dimensional virtual user interface item in response to the detection of virtual touch.

3. The apparatus of claim 1, wherein the apparatus is configured to display the three-dimensional virtual user interface item as opaque in response to detecting the presence of the input object, and the apparatus is configured to display the three-dimensional virtual user interface item as at least partially transparent in response to detecting the input object within the predetermined guard range.

4. The apparatus of claim 1, wherein the apparatus is configured to generate tactile and/or audible output in response to detecting the input object within the predetermined guard range for further alerting the user to avoid unintentionally touching the input surface.

5. The apparatus of claim 1, wherein the apparatus is configured to enter a first input mode in response to detecting the hovering input or the presence of the input object in close proximity to the input surface and enter a second input mode in response to detecting the touch input, and
the apparatus is configured to adapt the appearance of the three-dimensional virtual user interface item for notifying a user of change of an input mode between the first input mode and the second input mode in response to detecting the input object within the predetermined guard range.

6. The apparatus of claim 1, wherein the apparatus comprises an autostereoscopic display to display the three-dimensional virtual user interface item.

7. The apparatus of claim 1, wherein the apparatus is a mobile communications device comprising a touch screen and a proximity detection system with at least one proximity detector for detecting presence of the input object in close proximity to the input surface.

8. A method, comprising:
providing an input mode, in which a first function is associated with a hovering input and a second function is associated with a touch input to an input surface,
displaying a three-dimensional virtual user interface item, and
in response to detecting an input object within a guard range in relation to the input surface, adapting the three-dimensional virtual user interface item to alert the user to avoid unintentionally touching the input surface, wherein there are at least two available appearances of the three-dimensional virtual user interface item, each of the appearances being associated with a specific range of distance to the input surface.

9. The method of claim 8, wherein the input object is detected to virtually touch the three-dimensional virtual user interface item, and the appearance of the three-dimensional virtual user interface item is adapted in response to the detection of the virtual touch.

10. The method of claim 8, wherein the three-dimensional virtual user interface item is displayed as opaque in response to detecting the presence of the input object, and
the user interface item is displayed as at least partially transparent in response to detecting the input object within the predetermined guard range.

11. The method of claim 8, wherein tactile and/or audible output is generated in response to detecting the input object within the predetermined guard range for further alerting the user to avoid unintentionally touching the input surface.

12. The method of claim 8, wherein a first input mode is entered in response to detecting the hovering input or the presence of the input object in close proximity to input surface and a second input mode is entered in response to detecting the touch input, and
the appearance of the three-dimensional virtual user interface item is adapted to notify the user of a change of an input mode between the first input mode and the second input mode in response to detecting the input object within the predetermined guard range.

13. A user interface for an electronic device comprising a proximity detection system for detecting presence of an input object in close proximity to an input surface and a stereoscopic display, wherein the user interface is configured to provide an input mode in which a hovering input is associated with a first function and a touch input is associated with a second function,
- display a three-dimensional virtual user interface item, and
- adapt the appearance of the three-dimensional virtual user interface item to alert the user to avoid unintentionally touching the input surface in response to the input object being positioned within a guard range in relation to the input surface.

14. A computer readable storage medium comprising one or more sequences of one or more instructions which, when executed by one or more processors of an apparatus, cause the apparatus to at least perform:
- provide an input mode in which a first function is associated with a hovering input and a second function is associated with a touch input to an input surface,
- cause displaying of a three-dimensional virtual user interface item,
- determine distance of the input object to the input surface,
- adapt the appearance of the three-dimensional virtual user interface item to alert the user to avoid unintentionally touching the input surface in response to the input object being positioned within a guard range in relation to the input surface by selecting between at least two available appearances of the three-dimensional virtual user interface item on the basis of the distance of the input object to the input surface.

15. A computer readable storage medium of claim 14, comprising one or more sequences of one or more instructions for causing the apparatus to:
- detect the input object to virtually touch the three-dimensional virtual user interface item, and
- adapt the appearance of the three-dimensional virtual user interface item in response to the detection of virtual touch.

\* \* \* \* \*